US011985977B2

(12) United States Patent
Alder et al.

(10) Patent No.: US 11,985,977 B2
(45) Date of Patent: May 21, 2024

(54) USE OF COMPOSITION AS A GROWTH PROMOTANT FOR PLANTS

(71) Applicant: UENME Global Pty LTD, Gin Gin (AU)

(72) Inventors: Robert Alder, Gin Gin (AU); David Tomlinson, Northbridge (AU)

(73) Assignee: UENME GLOBAL PTY. LTD., Queensland (AU)

( * ) Notice: Subject to any disclaimer, the term of this patent is extended or adjusted under 35 U.S.C. 154(b) by 582 days.

(21) Appl. No.: 17/285,178

(22) PCT Filed: Oct. 16, 2019

(86) PCT No.: PCT/AU2019/000130
§ 371 (c)(1),
(2) Date: Apr. 14, 2021

(87) PCT Pub. No.: WO2020/077385
PCT Pub. Date: Apr. 23, 2020

(65) Prior Publication Data
US 2021/0392894 A1  Dec. 23, 2021

(30) Foreign Application Priority Data

Oct. 19, 2018 (AU) .............................. 2018903970
Mar. 13, 2019 (AU) .............................. 2019900823

(51) Int. Cl.
*A01N 43/64* (2006.01)
(52) U.S. Cl.
CPC .................................. *A01N 43/64* (2013.01)
(58) Field of Classification Search
CPC combination set(s) only.
See application file for complete search history.

(56) References Cited

U.S. PATENT DOCUMENTS

| 3,901,677 A | * | 8/1975 | Nakamura | ................ C05F 9/02 |
| | | | | 588/407 |
| 5,347,077 A | | 9/1994 | Hooykaas | |
| 6,086,921 A | | 7/2000 | Domenico | |
| 6,716,366 B2 | | 4/2004 | Waldmann | |

FOREIGN PATENT DOCUMENTS

| CN | 104531159 A | | 4/2015 |
| CN | 105154102 A | | 12/2015 |
| CN | 106047367 A | | 10/2016 |
| CN | 106479510 A | | 3/2017 |
| CN | 104529678 B | | 11/2017 |
| CN | 107445712 A | | 12/2017 |
| DE | 19715729 A1 | | 10/1998 |
| KR | 1020130079794 | * | 7/2013 |
| WO | 2018032810 A1 | | 2/2018 |

OTHER PUBLICATIONS

Nebraska (https://digitalcommons.unl.edu/cgi/viewcontent.cgi?article=1154&context=ndor), 1-35 (Year: 2016).*
Ojekunle et al. (African J. of Envir. Sci. and Technology, 2015, 9(2), 136-142) (Year: 2015).*
Kalaivanan et al. (Mech. of Heavy metal toxicity in plants, from Abiotic stress physiol. of Hort. Crops, 2016, p. 85-102) (Year: 2016).*
Alengebawy et al. (Toxics, 2021, 9(3), 42, p. 1-33).*
Tchounwou et al. (EXS. 2012; 101: 133-164).*
International Search Report dated Jan. 16, 2020 for corresponding International Application No. PCT/AU2019/000130.
Burstrom Hans et al: "Growth Regulation by Metals and Chelates", In: "Advances in Botanical Research", 1963, XP055918412, DOI: 10.1016/S0065-2296(08)60179-2.

* cited by examiner

*Primary Examiner* — Erin E Hirt
(74) *Attorney, Agent, or Firm* — TAROLLI, SUNDHEIM, COVELL & TUMMINO L.L.P.

(57) ABSTRACT

A method of promoting the growth of a plant comprising the application of an effective amount of 1,3,5-Triazinane-2,4,6-Trithione (TMT) to the plant. Particularly, the TMT is in an aqueous solution in a concentration range of 0.01% w/v to 0.1% w/v. In one embodiment the aqueous solution is applied to the plant by foliar spray. In another embodiment aqueous solution containing the TMT is mixed with zeolite.

22 Claims, No Drawings

USE OF COMPOSITION AS A GROWTH PROMOTANT FOR PLANTS

RELATED APPLICATIONS

The present application is a U.S. National Stage application under 35 USC 371 of PCT Application Serial No. PCT/AU2019/000130, filed on 16 Oct. 2019; which claims priority from AU Patent Application No. 2018903970, filed 19 Oct. 2018; and from AU Patent Application No. 2019900823, filed 13 Mar. 2019, the entirety of each of which are incorporated herein by reference.

TECHNICAL FIELD

This invention relates to the use of 1,3,5-Triazinane-2,4,6-Trithione in horticulture. In particular the present invention is described with reference to use of 1,3,5-Triazinane-2,4,6-Trithione as a growth promotant for plants. More particularly the invention is described with reference to 1,3,5-Triazinane-2,4,6-Trithione being used as a growth promotant for plants, as a means of initiating early fruiting in a fruit bearing plant, and as an antifungal treatment for plants and vicinal soil.

BACKGROUND

Hereinafter 1,3,5-Triazinane-2,4,6-Trithione (chemical formula $C_3H_3N_3S_3$) will be referred to as "TMT" for ease of reference.

Since the 1970's it has been known to improve soil containing heavy metals. Metal ions such as Cd, Hg, Pb etc., typically discharged from industrial processes have accumulated in soil. U.S. Pat. No. 3,901,677 (Nakamura et al.) describes the use of mercapto-s-triazines and water soluble salts to treat soil contaminated with heavy metals.

TMT (CAS No. 17766-26-6) is a reagent that binds to and precipitates heavy metals and is typically commercially supplied in a 15% aqueous solution for such a purpose.

In China there is a significant portion of agricultural land that is polluted with heavy metals. This is because the arable land is quite close to areas of urbanisation and industrial complexes, and the arable land has become polluted with heavy metals. Whilst crops are still capable of growing where such heavy metals exist in the soil, the heavy metals are drawn into the crop plants and therefore pose a health risk to humans and animals alike. Crops, especially rice grown on that land, have had to be withdrawn from sale due to the high levels of lead and other heavy metals. Remediation of the land with TMT mixed into the soil has been used to precipitate such heavy metals with high efficiency.

The earlier mentioned commercially supplied TMT (in a 15% aqueous solution) is for the abovementioned purpose of remediating soil by precipitating the heavy metals, and for adding same to waste water of industrial production processes so that heavy metals are substantially removed, thereby minimizing the risk to humans and the environment at large.

All known uses to date of TMT in horticulture and remediation of land have been to act as a precipitant of heavy metals and have been used as an additive to the soil. Prior art directed to soil remediation and repair include CN105154102A (Gong Canfeng), CN106047367(Wang Lu), CN106479510 (Kuang Xinsheng) and DE19715729 (Maerker Umwelttechnik GmbH). In all these prior art examples to be effective as an immobiliser of heavy metals, the TMT must be mixed and distributed through the soil.

The present invention seeks to provide TMT for additional uses in horticulture.

SUMMARY OF INVENTION

According to a first aspect of the present invention, there is provided a method of promoting the growth of a plant comprising the application of an effective amount of TMT to the plant.

In a preferred form said TMT is in an aqueous solution in a concentration range of 0.01% w/v to 0.1% w/v.

In one preferred embodiment said aqueous solution is applied to said plant by foliar spray.

In another preferred embodiment said aqueous solution is applied to the stem of said plant.

It is also preferred that said TMT is in an aqueous solution in a concentration of about 0.03% w/v.

In one embodiment said TMT is absorbed into zeolite or a composite material including zeolite.

In one preferred embodiment said zeolite or composite material including zeolite is in less than a 2.2 mm particle diameter.

In another preferred embodiment said zeolite or composite material including zeolite is fine powdered zeolite of less than 40 u.

In another preferred embodiment said plant is any one of grass, *Mangifera indica*, *Macadamia*, *Persea americana*, *Musa*, *Eucalyptus*, *Corymbia*, *Angophora*, *Araucaria*, *Cassia*, *Bauhinia* and *Grevillea*.

In another preferred embodiment said plant is a fruit bearing plant, and application of an effective amount of TMT to said fruit bearing plant initiates early fruiting. Preferably said plant is any one of *Mangifera indica*, *Macadamia*, *Persea americana* and *Musa*.

In another preferred embodiment said plant is a fruit bearing plant, and application of effective amount of TMT to said fruit bearing plant increases the sugar content of fruit borne by said plant. Preferably said plant is a *Mangifera indica*.

In another preferred embodiment, in addition to promoting the growth of said plant, said effective amount of TMT kills fungal pathogens. Preferably TMT is applied upon the plant or to soil surrounding the plant.

Preferably said pathogens are any one or more of members of the genus *Phytophthora* spp, of the genus *Pithium* spp, of the genus *Phellinus* spp, or of the genus *Fusarium* spp.

In a further preferred embodiment said pathogens are from the species *Fusarium oxysporum*.

In a further preferred embodiment said pathogens are from the species *Phytophthora cinnamomi*.

In a further preferred embodiment said TMT is absorbed into zeolite or a composite material including zeolite, and said zeolite or said composite material including zeolite is disposed on a carrier material, and said carrier material is applied against the stem, roots or foliage of a plant.

According to a second aspect of the present invention, there is provided a method of in combination initiating early fruiting and promoting the growth of a fruit bearing plant, comprising the application of an effective amount of TMT either by foliar spray to said plant or applied to the stem of the plant, and wherein said TMT is in aqueous solution in a concentration range of 0.01% w/v to 0.1% w/v.

In one preferred embodiment said fruit bearing plant is anyone of a *Mangifera indica*, *Macadamia*, *Persea americana* and *Musa*.

According to a third aspect of the present invention, there is provided a method for initiating early fruiting of a fruit bearing plant comprising the application of an effective amount of TMT to the plant.

In a preferred form said TMT is in aqueous solution in a concentration range of 0.01% w/v to 0.1% w/v.

In a preferred embodiment said aqueous solution is applied to said plant by foliar spray or applied to the stem of said plant.

In a further preferred embodiment said plant is anyone of a *Mangifera indica, Macadamia, Persea american* or *Musa*.

BEST MODE OF CARRYING OUT THE INVENTION

TMT when diluted in water 1 in 1000 to 1 in 100, namely in a 0.1% to 1% w/v aqueous solution, can be used as a growth promotant when applied as a foliar spray to many species of plants. Growth is promoted to all vegetative tissues, roots, stems and leaves, as well as floral and fruiting tissues.

Details of various examples will now be provided. It should be understood, that in all the examples given where the orchards, trees, pasture areas and surrounding soils are located, these are not contaminated with accumulated heavy metals.

Example 1

In an avocado (*Persea americana*) orchard in Queensland, an area of the orchard was selected with poor tree health.

TMT supplied in a 15% aqueous solution was diluted in collected rainwater at 1 in 400, namely in a 0.0375% w/v aqueous solution, was applied with a fire-fighting pump and sprayed to the soil only beneath two trees. This spraying mimicked a tree sprinkler application and was applied as twenty litres per tree.

Within one week of spraying the two selected trees showed indications of marked new growth.

Within seven weeks of spraying the two treated trees were observed significantly different to the surrounding trees.

Within four months the two treated trees had significantly grown by about 20-25% more in size than the surrounding trees.

At the time this area of the orchard was abandoned, at about seven and a half months after spraying, the feeder roots of the two trees were examined and healthy feeder roots and earthworms were found under the treated trees.

Example 2

On a property near Gin Gin, Queensland a pasture area of Rhodes grass was suffering from "pasture dieback".

On 27 Jun. 2017 TMT supplied in a 15% aqueous solution diluted in rainwater at 1 in 500 (10 ml/5 L), namely in a 0.03% w/v aqueous solution was applied to a portion of that pasture area hereinafter referred to as the "treated grass".

On 8 Aug. 2017 grass samples were taken from the treated grass (as a test sample) and from the surrounding untreated grass (as a control sample), and each of these grass samples were placed in separate open containers containing 10 ml of rainwater.

By 28 Aug. 2017, the "treated grass" sample showed shoots and roots formed thereon and no change occurred on the untreated control sample.

Example 3

On a property near Gin Gin, Queensland three native bloodwood (*Eucalyptus*) trees had been observed in April 2017 to have lost most of their leaves and appeared to be dying. On 10 Apr. 2017 TMT supplied in a 15% aqueous solution diluted in rainwater at 1 in 500 (10 ml/5 L), namely in 0.03% w/v aqueous solution was first applied by drenching the bark and surrounding soil for each of the three.

Second and third similar applications of a 0.03% w/v TMT aqueous solution were made to the three trees on 3 June and 27 June respectively.

Later new shoots from branch axils and new leaf growth appeared.

It has also been found that the functionality to stimulate growth is increased synergistically when TMT is mixed with a liquid humate solution containing fine powdered zeolite (<40 u).

Example 4

Laboratory study on *Phytophthora* (30 Sep. 2017 onwards to August 2018)

Crop avocado soil with *Phytophthora*.

Treatment TMT supplied in a 15% aqueous solution diluted at 1:500 (10 ml/5 L)

Result kills and stops lifecycle of *Phytophthora*. If spores breakout of sporangias they do not develop.

Similar studies were also carried out in December 2017 on *Phellinus* and *Pithium* pathogens found on avocado (*Persea americana*) and *Eucalyptus* with similar TMT aqueous solutions, and the result was that *Phellinus* and *Pithium* in the samples studied appeared to have been killed.

Example 5

On a mango (*Mangifera indica*) orchard in Queensland three mango trees were observed to be affected by fungal pathogens *Phellinus* and *Phytophthora*. TMT supplied in a 15% aqueous solution diluted in rainwater at 1 in 500 (10 ml/5 L), namely in 0.03% w/v aqueous solution was used. These three trees were foliar and stem sprayed (2 litre/tree each time) with the solution, once, twice or three times some two weeks apart. The fungal pathogen was killed. The growth response was extraordinary, but in order of the number of sprays. Leaves in both number and size followed suit as did flower spikes and fruit set. Fruit harvested was 10% greater in mass for each additional spray. It was observed but not measured that fruit was sweeter with increased spraying.

Example 6

In a second trial of mango trees (cv Kensington Pride), also in Queensland, using aqueous solution and similar foliar and stem spraying as in earlier mentioned Example 5, the fruits were noticeably sweeter with brix (sugar content measurement) measured at approximately 10% higher than the control trees. All the trees were sickly looking at the start and all had the *Phellinus* (fungal pathogen) fruiting bodies under the bark on the skin. The fungal pathogen was killed, and the treated trees had bigger brighter green leaves, much less disease and fewer insect predators than surrounding trees.

It was also noted that the trees that were treated were not affected by an unseasonal frost, whereas those nearby trees that were not sprayed were subject to frost damage.

Example 7

On a banana (*Musa*) plantation in Queensland, banana plants (cv Lady Finger) were identified to be affected with *Fusarium oxysporum* (an ascomycete fungus). Vascular colourisation was seen where the fungus had colonised. A trial using foliar sprays was used. TMT supplied in a 15% aqueous solution diluted in rainwater at 1 in 500 (10 ml/5 L), namely in 0.03% w/v aqueous solution was used for the foliar spraying of seven affected banana plants. This trial was 100% successful on killing off the fungus on the seven affected plants. A control group of a further seven affected plants were sprayed only with water, and no change was noted on the control group.

Example 8

On a property near Gin Gin Queensland, three mango (*Mangifera indica*) trees (cv Kensington Pride) all the same age, do not show normal flowering until end of August. These mango trees are in rocky poor soil, that is not irrigated.

On 28 Jun. 2019, TMT supplied in a 15% aqueous solution diluted in rainwater at 1 in 500 (10 ml/5 L), namely in 0.03% w/v aqueous solution was applied by foliar spraying.

Within two weeks all three mango trees were coming into flower, as flower spikes were being observed. By 18 July, some three weeks after spraying, the three mango trees were observed to continue showing flowering.

Similar mango trees in the surrounding area do not show unseasonal flowering at the same time as the abovementioned trees.

By 3 Aug. 2019 (some thirty-six days from the initial and sole spraying), the initiated flowers had matured, and the setting of fruit had commenced. All three mango trees were also still showing an abundance of new flowering, without any watering or fertilizer since the TMT spraying, and the trees were not showing any signs of stress.

By 28 Sep. 2019 (some ninety-six days from the initial and sole spraying), the fruit on these trees are growing apace.

The use of TMT as described in Example 8, when used commercially may provide a mango orchard owner/manager to selectively initiate early flowering and fruiting of their mango trees in stages. This may provide the opportunity to get earlier premium prices by commencing the picking season earlier. The use of TMT sprayed on the orchard of mango trees at spaced apart times may allow the orchard owner/manager to stage the fruit picking so as to not have to pick the fruit all at one time, thus lessening the number of pickers required at one time. As mangos are grown in various areas across northern Australia, the use of TMT may also be used to initiate early flowering and fruiting in mango orchards in one region, to take advantage of seasonal factors that have impacted mango production in another region.

On the same property as in Example 8, a *Macadamia* tree was also foliar sprayed on 28 Jun. 2019, with similar TMT in 0.03% w/v aqueous solution as was used in Example 8. This *macadamia* tree also came into flower after about two weeks, and after three weeks had continued to produce flowers. By 3rd August (some thirty-six days after spraying the flowers have matured and the setting of fruit(nut) has commenced. Normally this *macadamia* tree flowers in late August. By 28 Sep. 2019 (some ninety-six days from the initial and sole spraying), the fruit on this tree is growing apace.

Native pine trees (*Auracaria* spp.) of differing varieties, also on the same property as in Example 8, were also sprayed on the 28 Jun. 2019, and they have all have all gone into new growth This is out of seasonal growth for them.

Various trials on other species will now be discussed generally.

Grass Trials

In addition to abovementioned Example 2, various grasses have been trialled.

Treatment of grass die back from *Phellinus* and *Pithium* were successful across a range of grass species including but not limited to blue grass, couch, Rhodes and turf grasses from different habitats. There is some difficulty in ascribing the cause of the results due to the presence of a mealy bug which is attacking the grass roots. However, treatment with TMT supplied in a 15% aqueous solution diluted in water at 1 in 500 (10 ml/5 L), namely in 0.03% w/v aqueous solution was used for spraying and overturned the mite infection. Quantification of increase in dry matter resulted in doubling the mass of the control (200% +/−4%).

Trials were performed on grazing land, a football field, a house front lawn with controls and on golf course couch greens. In all trials on soil with spray application (50 L/50 m$^2$) relative to controls with water only or TMT+humate solution applied in zeolite or in biochar+/− TMT and humate, 1 kg/10 m$^2$ with 40 L of solution/T of absorbent. Dead patches were resolved completely in 10-14 days, except for the football field which may have been compromised by using chlorinated town water, instead of rain water for the aqueous solution.

Tree Trials

In addition to abovementioned Example 3, various trees and plants such as *Araucaria* (native soft woods), *Cassia* and *Bauhinia* (related to *Acacia*), *Grevillea* (related to *Macadamia*) have been trialled and by spraying with TMT supplied in a 15% aqueous solution diluted in water at 1 in 500 (10 ml/5 L), namely in 0.03% w/v aqueous solution. All these trees which were showing poor growth, showed marked improvement with growth after a few weeks of spraying.

Additional trials were also carried out on Eucalypts other than that described in Example 3.

Under current drought conditions and the presence of *Phytophthora* in the soil, all of the additional trees we trialled looked close to death. The bark of all the following trees were sprayed viz. blue gum, spotted gum, blood wood, lemon scented gum, Moreton Bay ash and *Corymbia costata*. In all cases there was a slow but consistent response, with epicormic buds appearing on the tree trunks, under the bark and new leaves appearing on apparently dead branches.

The various examples and trials described above clearly indicate that a small amount of TMT, in an aqueous solution in a concentration range of 0.01% w/v to 0.1% w/v, but typically about 0.3% w/v when sprayed (foliarly and stem) on plants and grasses, is effective as a growth promotant on the plants, and/or a treatment for fungal pathogens.

In the various abovementioned examples and trials it has been observed that the effectiveness of using a small amount of TMT in aqueous solution as a growth promotant for plants, is markedly apparent when the plants prior to the application of TMT aqueous solution have been stressed for example due to drought, poor soil and fungal pathogens. However, even when the plants are not stressed initially, the application of the TMT aqueous solution is effective as a growth promotant. Furthermore, the growth promotant effect is unlike any of the recognised plant growth hormone effects, which have clear diagnostic features.

In the prior art the use of spraying a TMT aqueous solution to plants was not known, and the only use of TMT was to deal with soil remediation in significantly higher concentrations.

The embodiments described herein have many applications for horticulture and agriculture and can be used to deal with problems not previously able to be dealt with in a cost effective manner.

For example, there are over six hundred and fifty species of closely related genera, *Eucalyptus, Corymbia* and *Angophora*. *Eucalyptus* die back is a very serious problem in many parts of the World particularly where fine quality timber is used in furniture manufacture, but also on grazing land and in forests of high commercial value. In Eastern Australia the fungal pathogen is *Phytophthora cinnamoni*, as it is also in SW Western Australia, in the Jarrah and Karri forests, and in the South Island of New Zealand in the soft wood Kauri forests. It is envisaged that Eucalypt die back can readily be treated with inexpensive spraying using TMT.

Various Other Crop Trials

In addition to trials on avocadoes and mangoes as described earlier in Examples 1, 5 and 6, other crop vegetation, such as hemp, macadamias, grapes, citrus (mandarins) and capsicum have been treated by spraying using TMT supplied in a 15% aqueous solution diluted in water at 1 in 500 (10 ml/5 L), namely in 0.03% w/v aqueous solution. For all these crops the plants showed improvement of growth.

Use of TMT with Zeolite

Also, TMT diluted with water and absorbed into zeolite (<2.2 mm particle diameter) when applied to topsoil provides improvement through uptake by roots. Furthermore, TMT, when diluted with water and absorbed into zeolite (<2.2 mm particle diameter) and then applied onto soil, is slowly released into the topsoil after wetting sequentially up to ten times.

TMT diluted with water kills the soil borne fungal pathogens, *Phytothphora cinnamomi, Pithium* spp., and *Phellinus* spp. on contact.

TMT diluted with water and absorbed into zeolite (<2.2 mm particle diameter) retains its capability to kill such *Phytophthora, Phellinus* and *Pithium* pathogens with sequential wetting up to ten times.

The zeolite that absorbs the TMT may be provided by itself, or in a composite material, such as one primarily containing zeolite and biochar. Preferably the zeolite makes up about 50-70% of the composite material by mass.

As a number of the abovementioned examples have demonstrated the anti-fungal properties when using TMT as a spray, it is proposed that using TMT diluted with water and absorbed into zeolite or a composite material containing zeolite, can be used as an anti-fungal agent. Whilst it is envisaged that such treatment could be delivered by spraying, another preferable way of administering the TMT is as follows.

A thin mat, bandage or other carrier material is used to carry zeolite or the composite material comprising zeolite. One such carrier material is coir (coconut fibre) mat. TMT diluted with water is absorbed into the zeolite which in turn is deposited on the coir mat. This coir mat (carrier material) is then applied against the stem, roots or foliage of a plant. The TMT is slowly released from the zeolite by wetting, thereby contacting with the plant and acting as an anti-fungal treatment and/or preventative measure. At present trials are being carried out to assess the efficacy of same.

TMT diluted with water appears not to be toxic to other soil microbes including other pathogens, fungi, bacteria as well as other soil or water borne biota. Furthermore, TMT diluted with water as described in the abovementioned embodiments and examples has been observed to apparently be benign to most other small organisms including but not limited to insects, annelids, crustaceans, molluscs, arachnids etc as well as bigger ones like birds and animals. The LD-50 for the rat is 2× the body mass of the rat, so it would drown before dying by ingestion.

It should be understood that the use of TMT in small effective amounts as earlier described, may be used for other orchard crops such as apple trees (*Malus domestica*) for the purposes of a growth promotant and/or treatment of fungal pathogens.

The invention claimed is:

1. A method of promoting the growth of a plant comprising applying an effective amount of 1,3,5-triazinane-2,4,6-trithione to the foilage or stem of the plant, wherein the soil in which the plant grows is not contaminated with accumulated heavy metals.

2. The method of claim 1, wherein said 1,3,5-triazinane-2,4,6-trithione is in an aqueous solution in a concentration range of 0.01% w/v to 0.1% w/v.

3. The method of claim 2, wherein said aqueous solution is applied to said plant by foliar spray.

4. The method of claim 2, wherein said aqueous solution is applied to the stem of said plant.

5. The method of claim 2, wherein said 1,3,5-triazinane-2,4,6-trithione is in an aqueous solution in a concentration of about 0.03% w/v.

6. The method of claim 1 wherein said 1,3,5-triazinane-2,4,6-trithione is absorbed into zeolite or a composite material including zeolite.

7. The method of claim 6, wherein said zeolite or composite material including zeolite is in less than a 2.2 mm particle diameter.

8. The method of claim 6, wherein said zeolite or composite material including zeolite is fine powdered zeolite of less than 40 micron.

9. The method of claim 2, wherein said plant is any one of grass, *Mangifera indica, Macadamia, Persea Americana, Musa, Eucalyptus, Corymbia, Angophora, Araucaria, Cassia, Bauhinia* and *Greville*.

10. The method of claim 1, wherein said plant is a fruit bearing plant, and application of an effective amount of 1,3,5-triazinane-2,4,6-trithione to said fruit bearing plant initiates early fruiting.

11. The method of claim 10, wherein said plant is any one of *Mangifera indica, Macadamia, Persea Americana* and *Musa*.

12. The method of claim 1, wherein said plant is a fruit bearing plant, and application of effective amount of 1,3,5-triazinane-2,4,6-trithione to said fruit bearing plant increases the sugar content of fruit borne by said plant.

13. The method of claim 12, wherein said plant is a *Mangifera indica*.

14. The method of claim 1, wherein in addition to promoting the growth of said plant, said effective amount of 1,3,5-triazinane-2,4,6-trithione kills fungal pathogens from any one or more of members of the genus *Phytophthora* spp, of the genus *Pithium* spp, of the genus *Phellinus* spp, or of the genus *Fusarium* spp.

15. The method of claim 14, wherein said pathogens are from the species *Fusarium oxysporum*.

16. The method of claim 14, wherein said pathogens are from the species *Phytophthora cinnamomic*.

17. A method of in combination initiating early fruiting and promoting the growth of a fruit bearing plant, comprising applying an effective amount of 1,3,5-triazinane-2,4,6-trithione either by foliar spray to said plant or applied to the stem of the plant, and wherein said 1,3,5-triazinane-2,4,6-trithione is in an aqueous solution in a concentration range of 0.01% w/v to 0.1% w/v, and the soil in which the plant grows is not contaminated with accumulated heavy metals.

18. The method of claim 17, wherein said fruit bearing plant is any one of a *Mangifera indica, Macadamia, Persea Americana*, and *Musa*.

19. A method for initiating early fruiting of a fruit bearing plant comprising the application of an effective amount of 1,3,5-triazinane-2,4,6-trithione to the plant.

20. The method of claim 19, wherein said 1,3,5-triazinane-2,4,6-trithione is in aqueous solution in a concentration range of 0.01% w/v to 0.1% w/v.

21. The method of claim 20, wherein said aqueous solution is applied to said plant by foliar spray or applied to the stem of said plant.

22. The method of claim 19, wherein said plant is anyone any one of a *Mangifera indica, Macadamia, Persea americana* and *Musa*.

* * * * *